W. D. Hooker,
Securing Cutters in Heads.
Nº 14,871.   Patented May 13, 1856
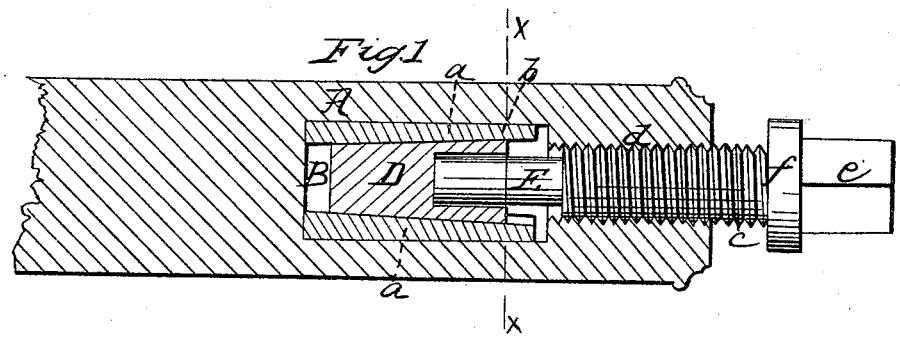
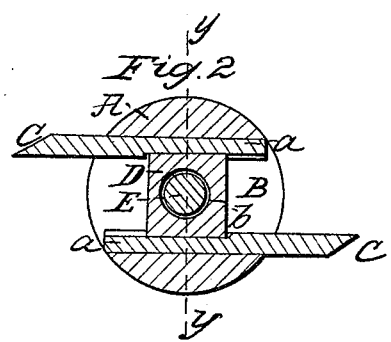

UNITED STATES PATENT OFFICE.

W. D. HOOKER, OF DEDHAM, MASSACHUSETTS.

METHOD OF SECURING KNIVES TO CUTTER-HEADS.

Specification of Letters Patent No. 14,871, dated May 13, 1856.

*To all whom it may concern:*

Be it known that I, WILLIAM D. HOOKER, of Dedham, in the county of Norfolk and State of Massachusetts, have invented a new and Improved Mode of Securing Cutters in Heads; and I do hereby declare that the following is a full, clear, and exact description of the same, reference being had to the annexed drawings, making a part of this specification, in which—

Figure 1, is a longitudinal section of a cutter head with the cutters secured in it according to my improved plan $y, y$, Fig. 2, shows the plane of section. Fig. 2, is a transverse section of the same, $x, x$, Fig. 1, showing the plane of section.

Similar letters of reference indicate corresponding parts in both figures.

The nature of my invention consists in securing the cutters in the heads by means of a wedge and screw as will be hereafter fully shown and described.

To enable others skilled in the art to fully understand and construct my invention, I will proceed to describe it.

A, represents the cutter-head constructed of metal and of cylindrical or other form.

B, represents a slot or rectangular opening which is made transversely through the head, and C, C, are the cutters the shanks $a$, $a$, or the sides of the cutter head A, either or both being made of taper form longitudinally with the head A. The shanks $a, a$, of the cutters are placed against opposite sides of the slot or opening B, and a wedge D, is inserted between them, the cutters projecting from opposite sides of the head A.

The wedge D, has a hole or opening $b$, made in its outer end to receive the end of a rod E, which passes through the end of the head A, and into the hole or opening $b$, in the wedge. The rod E, has a screw thread $c$, cut on its outer part which thread works in an internal screw thread $d$, cut in the hole in the end of the head through which the rod E, passes. The rod E, has a square $e$, on its outer end and collar $f$, see Fig. 1.

By turning the rod E, the wedge D, will be forced between the shanks $a, a$, of the cutters, and as the shanks of the cutters or sides of the cutter head, either or both are of taper form corresponding to the taper of the wedge, the sides of the wedge will bear firmly against the shanks $a, a$, and will bind them firmly in the slot or opening $b$, thereby securing the cutters in the head. The rod E, serves as a sufficient guide to the wedge as the inner end of said rod fits in the opening $b$, of the wedge and causes it to move in line with the rod when the rod is turned and the wedge forced inward between the shanks of the cutters.

The cutters of course may be made of any form according to the work intended to be done, and the improvement is applicable to all cutter heads. The cutters may be firmly adjusted within the head and removed therefrom with the greatest facility.

I do not claim operating a wedge by a screw, it having been done before.

What I claim as new and desire to secure by Letters Patent, is—

The cutter head A, the shanks $a, a$, of the cutters, the wedge D, the screw rod E, the whole in combination, arranged substantially as described, and for the purpose specified.

WM. D. HOOKER.

Witnesses:
C. GUILD, Jr.,
E. WILKINSON.